United States Patent [19]

Tsuchiya et al.

[11] Patent Number: 5,115,378

[45] Date of Patent: May 19, 1992

[54] ELECTRIC DOUBLE LAYER CAPACITOR

[75] Inventors: Yoshinobu Tsuchiya, Fujisawa; Ken Kurabayashi, Chigasaki; Seiichiro Kito, Ayase; Yoriaki Niida, Yamato, all of Japan

[73] Assignee: Isuzu Motors Limited, Tokyo, Japan

[21] Appl. No.: 653,286

[22] Filed: Feb. 11, 1991

[30] Foreign Application Priority Data

Feb. 9, 1990 [JP] Japan ................... 2-030829

[51] Int. Cl.⁵ ............................................. H01G 9/00
[52] U.S. Cl. ................... 361/502; 29/25.03
[58] Field of Search .............. 361/502; 29/25.03

[56] References Cited

U.S. PATENT DOCUMENTS 4,562,511  12/1985  Nishino et al. ............. 361/502
4,616,290  10/1986  Watanabe et al. ........... 361/502

*Primary Examiner*—Donald A. Griffin
*Attorney, Agent, or Firm*—Staas & Halsey

[57] ABSTRACT

An electric double layer capacitor has an electric double layer composed of an interface between activated carbon and electrolyte. The electric double layer capacitor includes a pair of polarized electrodes each comprising an electrode body in the form of a porous sintered body of joined active carbon particles. When the electrode body is sintered, an electrically conductive layer is formed on a surface of the electrode body. With this construction, the contact resistance between the electrode body and a current collector through the electrically conductive layer is reduced, so that the electric double layer has a reduced internal resistance.

5 Claims, 2 Drawing Sheets

ELECTRIC DOUBLE LAYER CAPACITOR

BACKGROUND OF THE INVENTION

The present invention relates to an electric double layer capacitor of high electrostatic capacitance which utilizes the principles of an electric double layer that is composed of an interface between activated carbon and electrolyte.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,936, for example. The electric double layer capacitor disclosed therein comprises a frame-shaped gasket, a pair of polarized electrodes made of activated carbon particles and disposed in the gasket, a separator disposed between the polarized electrodes for preventing electrons from moving between the electrodes, and a pair of current collectors mounted respectively on the opposite surfaces of the polarized electrodes and having peripheral edges bonded to the gasket. The polarized electrodes are made as paste electrodes from a concentrated slurry which is a mixture of powdery or particulate activated carbon and an electrolyte.

It is important that the internal resistance of such an electric double layer capacitor with paste electrodes be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell of the electric double layer capacitor should be kept under vertical pressure to bring the particles of the paste activated carbon into good electric contact with each other. Conventional electric double layer capacitors require each cell to be kept under a pressure of about 100 kg/cm² though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basic cell. Therefore, the pressure to be applied to the basic cell has to be increased. Increasing the pressure, however, causes some practical problems such as the selection of means for applying the pressure and the need for high rigidity for the outer cell which houses the basic cell.

The contact resistance between the polarized electrodes and the current collectors of conventional electric double layer capacitors is so large that it is responsible for presenting a high internal resistance. One proposed electric double layer capacitor which has a reduced contact resistance between the polarized electrodes and the current collectors and hence a reduced internal resistance is disclosed in Japanese Laid-Open Patent Publication No. 63(1988)-232309.

According to the disclosure of the above publication, a thermoplastic resin is heated and dissolved in an electrolytic solution, and the solution is cooled into a gel which does not flow or is not deformed and remains in a solid phase unless an external force is applied thereto. Then, powder of activated carbon is added to the gel, and the mixture is kneaded by a roll mill. The kneaded mixture is shaped into a sheet which is cut off into polarized electrodes. Metallic powder of stainless steel is sprinkled over one surface of each of the polarized electrodes, and the sprinkled powder particles are embedded in the surface of the polarized electrode by being pressed by a roll, thus providing an electrically conductive layer which will reduce the contact resistance between the polarized electrode and a current collector. Since the electrically conductive layer is formed after the polarized electrode is fabricated, however, an increased number of processing steps are required to manufacture the electric double layer capacitor. In addition, the contact resistance between the polarized electrode and the electrically conductive layer is not satisfactory enough since they are electrically coupled to each other through contact between the particles.

SUMMARY OF THE INVENTION

It is an object of the present invention to provide an electric double layer capacitor which utilizes the principles of an electric double layer that is composed of an interface between activated carbon and electrolyte, the electric double layer capacitor having an electrically conductive layer on a surface of an electrode body to reduce the contact resistance between the electrode body and a current collector, and the electrode body and the electrically conductive layer having a reduced contact resistance there between so that the capacitor has a reduced internal resistance.

Another object of the present invention is to provide a method of manufacturing an electrode for an electric double layer capacitor, the method being capable of reliably forming an electrically conductive layer on a surface of an electrode body.

According to the present invention, there is provided an electric double layer capacitor having an electric double layer composed of an interface between activated carbon and electrolyte, comprising a pair of electrode bodies having surfaces confronting each other, each of the electrode bodies comprising a porous sintered body of joined active carbon particles, a pair of electrically conductive layers formed on respective other surfaces of the electrode bodies at the time the electrode bodies are sintered, a separator interposed between the electrode bodies, a gasket housing the electrode bodies and the separator therein, and a pair of current collectors disposed on the respective other surfaces of the electrode bodies in contact with the electrically conductive layers, respectively, the current collectors having respective peripheral edges joined to the gasket.

According to the present invention, there is also provided a method of manufacturing a polarized electrode for an electric double layer capacitor having an electric double layer composed of an interface between activated carbon and electrolyte, the method comprising the steps of placing an electrically conductive material in a sintering mold, placing powder of minute active carbon particles on the electrically conductive material in the sintering mold, pressing the powder of minute active carbon particles and the electrically conductive material in the sintering mold, and sintering the powder of minute active carbon particles and the electrically conductive material while under pressure, thereby forming an electrically conductive layer and an electrode body, respectively, which are intimately joined to each other.

The above and other objects, features and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

Figure 1:
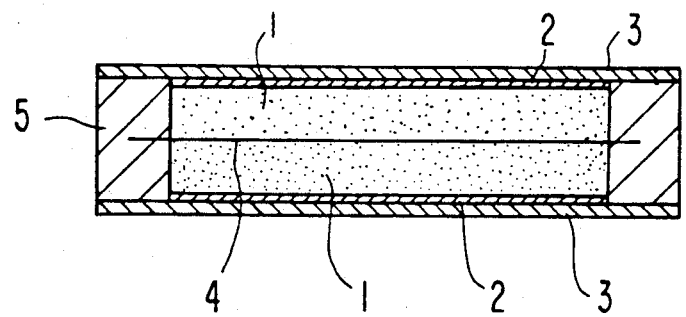
FIG. 1 is a cross-sectional view of an electric double layer capacitor according to the present invention.
Figure 3:
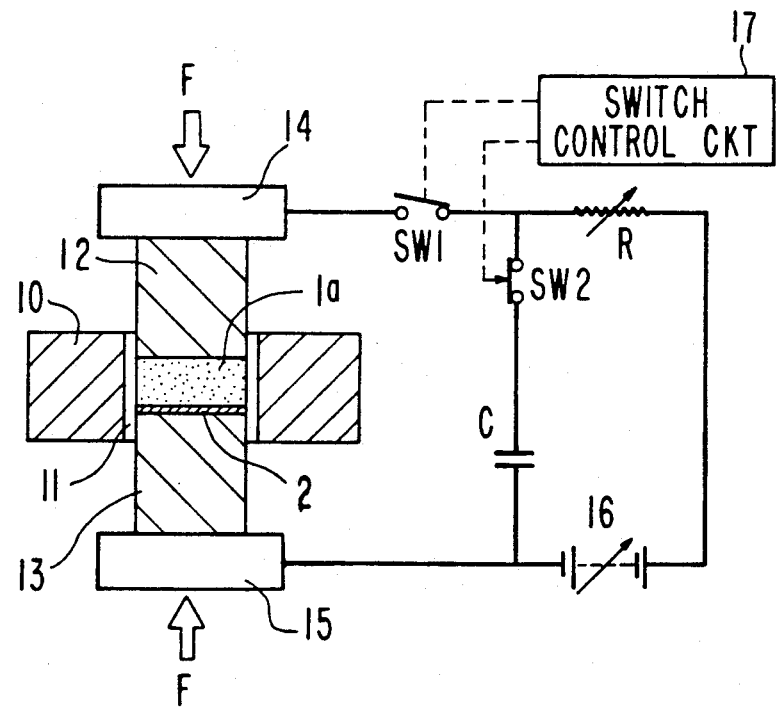
FIG. 3 is a circuit diagram showing an apparatus for manufacturing a porous sintered body as an electrode body according to the present invention.

FIG. 1 shows in cross section an electric double layer capacitor according to the present invention:

The electric double layer capacitor comprises a pair of polarized electrodes 1 with surfaces confronting each other. Each of the polarized electrodes 1 can be manufactured by a sintering apparatus as shown in FIG. 3. Specifically, powder of minute active carbon particles having an average particle diameter of about 20 μm is sintered into a porous sintered electrode body, which is then impregnated with dilute sulfuric acid.

The electric double layer capacitor also includes a pair of electrically conductive layers 2 which are formed respectively on the other surfaces of the electrode bodies of the polarized electrodes 1 at the time the electrode bodies are sintered. Each of the electrically conductive layers 2 is made of metallic powder or foil that is integrally joined to the electrode bodies in a manner as described later on.

The polarized electrodes 1 are housed in an annular gasket 5 which is made of electrically nonconductive rubber or synthetic resin. The polarized electrodes 1 are separated from each other by a separator 4 disposed therebetween. The separator 4 may be in the form of a piece of nonwoven fabric of porous polypropylene which is impregnated with an electrolytic solution. The separator 4 allows ions to pass therethrough, but prevents electrons from moving therethrough. The electric double layer capacitor further includes a pair of current collectors 3 disposed respectively on the outer surfaces of the electrically conductive layers 2 on the polarized electrodes 1. Each of the current collectors 3 is made of an electrically conductive film which is produced by kneading powder of electrically conductive material and synthetic resin. The current collectors 3 have peripheral edges bonded to the gasket 5.

Figure 2:
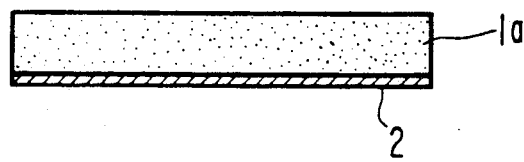
FIG. 2 is a cross-sectional view of an electrode serving as a polarized electrode in the electric double layer capacitor.

A method of manufacturing each of the polarized electrodes 1 with the electrically conductive layer 2, as shown in FIG. 2, will be described below with reference to the sintering apparatus shown in FIG. 3.

As shown in FIG. 3, powder of minute active carbon particles is placed in a sintering mold 10. The sintering mold 10 is made of a highly strong metal such as tungsten steel, and has a central hole for placing active carbon particles therein. The inner wall of the hole is coated with an insulating layer 11 which is made of an insulating material such as silicon oxide ($SiO_2$) or silicon nitride ($Si_3N_4$) and deposited by a known process such as vapor growth. Upper and lower plungers 12, 13 have lower and upper ends, respectively, inserted in the hole in the sintering mold 10. The upper and lower plungers 12, 13 are made of a heat-resistant metal such as tungsten, molybdenum, or the like. The upper and lower plungers 12, 13 are connected respectively to upper and lower electrodes 14, 15.

Although not shown in FIG. 3, the upper and lower plungers 12, 13 and the upper and lower electrodes 14, 15 are controllably pressed by a hydraulic press in the directions indicated by the arrows F so that a desired pressure can be imposed on minute particles for forming the polarized electrode 1 and an electrically conductive material for forming the electrically conductive layer 2, which are placed in the sintering mold 10. The minute particles and the electrically conductive material which are contained in the sintering mold 10 are placed in a desired atmosphere. The upper and lower electrodes 14, 15 are electrically connected to a series-connected circuit of switches SW1, SW2 and a capacitor C, and a series-connected circuit of a variable resistor R and a variable-voltage power supply 16 is connected parallel to a series-connected circuit of the capacitor C and the switch SW2. The on- and off-times of the switches SW1, SW2 are controlled by a switch control circuit 17. The switch SW1 comprises a normally open switch, and the switch SW2 comprises a normally closed switch.

The sintering mold 10 may be made of a ceramic material such as silicon oxide ($SiO_2$), silicon nitride ($Si_3N_4$), silicon carbide (SiC), or the like.

Operation of the apparatus shown in FIG. 3 for the manufacture of an electrode body which will form a polarized electrode of an electric double layer according to a first inventive example will be described below.

With only the lower plunger 13 inserted in the hole in the sintering mold 10, stainless steel powder having an average diameter of about 5 μm, which will form an electrically conductive layer 2, is placed on the lower plunger 13 up to a thickness ranging from 50 to 100 μm. The upper plunger 12 is then inserted into the hole in the sintering mold 10 to press the deposited stainless steel powder. Thereafter, the upper punger 14 is lifted out of the hole in the sintering mold 10. Then, over the compacted stainless steel powder, there is placed powder of minute active carbon particles having an average diameter of about 20 μm until the deposited powder has a thickness of 1.5 mm. The upper plunger 12 is again inserted into the hole in the sintering apparatus 10 to press the deposited powder of minute active carbon particles and the stainless steel powder under a predetermined pressure. Then, while the compacted powder of minute active carbon particles and stainless steel powder are being pressed, the switch SW1 is controlled so as to be repeatedly turned on and off.

The on-time of the switch SW1 is controlled so that it is equal to or shorter than a discharge time in which the charges in the capacitor C are discharged between the upper and lower electrodes 14, 15. The off-time of the switch SW1 is controlled so that it is substantially equal to or longer than a charge time in which the capacitor C can be charged. Therefore, a current flowing between the upper and lower electrodes 14, 15 is rendered variable from a maximum value to a minimum value.

Figures 4, 5:
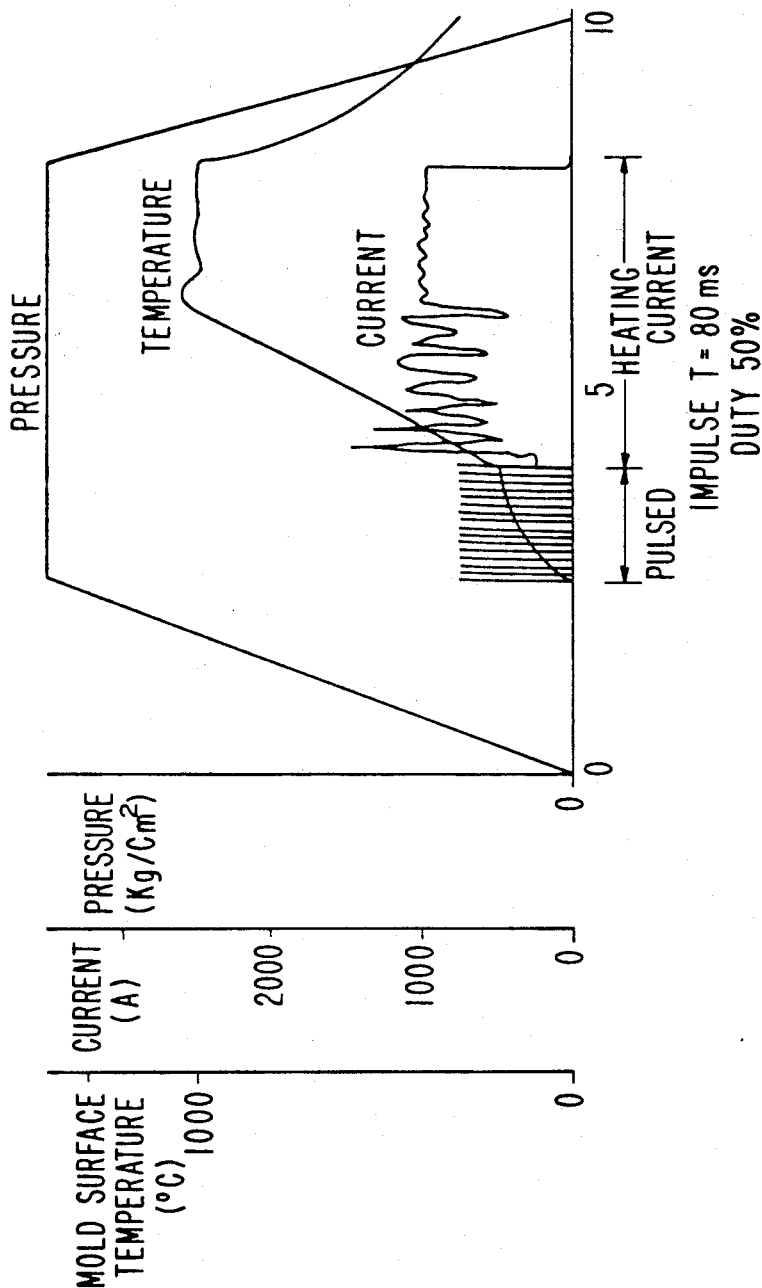
FIG. 4 is a graph showing the pressure applied to minute active carbon particles, the average current flowing through the minute active carbon particles, and the temperature of the minute active carbon particles, as they change with time.
FIG. 5 is a table of electrostatic capacitances and internal resistances of electric double layer capacitors according to inventive and comparative examples.

When the switch SW1 is thus repeatedly turned on and off, sharp pulsed impulse currents flow between the upper and lower plungers 12, 13, as shown in FIG. 4.

The pulsed impulse current is supplied between the upper and lower plungers 12, 13 until almost all the minute particles of active carbon sandwiched between the upper and lower plungers are brought into contact and fused to each other. Thereafter, while the pressure applied to the minute particles is being kept at a constant level, the switch SW2 is continuously turned off and the switch SW1 is continuously turned on, and the resistance of the variable resistor R and the voltage of the variable-voltage power supply 16 are regulated to continuously pass a heating current of a given value between the upper and lower electrodes 14, 15, as shown in FIG. 4.

After a target temperature is reached, the heating current which is supplied is kept at a constant level for thereby maintaining the porous sintered body of active carbon whose temperature has been increased thus far at a constant temperature (see FIG. 4).

Under such a condition, the minute active carbon particles of the porous sintered body are stably bonded together, and the stainless steel particles for forming an electrically conductive layer on one surface of the porous sintered body enter the interstices of the porous sintered body and are held in intimate contact therewith. Now, the discharge voltage applied between the upper and lower electrodes 14, 15 is turned off, and the pressure applied therebetween is also cut off. When the temperature of the porous sintered body has dropped to normal temperature, the porous sintered body is removed from the sintering mold 10.

As shown in FIG. 2, the electrode body, denoted at 1a, thus fabricated supports on its one surface an electrically conductive layer 2 of sintered stainless steel powder. Two such electrode bodies are combined together, and impregnated with dilute sulfuric acid. Using the polarized electrodes 1 thus fabricated, an electric double layer capacitor constructed as shown in FIG. 1 is manufactured.

An electric double layer capacitor according to a second inventive example is manufactured as follows:

Except that copper powder is employed instead of the stainless steel powder in the first inventive example, the same materials as those in the first inventive example are used, and an electrode body is fabricated using the sintering apparatus shown in FIG. 3 in the same manner as the first inventive example.

An electric double layer capacitor according to a third inventive example is essentially the same as the first inventive example except that gold powder is employed instead of the stainless steel powder in the first inventive example.

An electric double layer capacitor according to a fourth inventive example is essentially the same as the first inventive example except that stainless steel foil is employed instead of the stainless steel powder in the first inventive example.

FIG. 5 shows a table of electrostatic capacitances and internal resistances of the electric double layer capacitors according to the first through fourth inventive examples and also an electric double layer according to a comparative example. The electric double layer capacitor according to the comparative example includes a pair of polarized electrodes each comprising an electrode body composed of a sintered body of active carbon power having an average particle diameter of 20 $\mu$m and coated with acetylene black. In each of the inventive and comparative examples, the electrode body has a diameter of 20 82 m.

Study of FIG. 5 indicates that the electrostatic capacitances of the electric double layer capacitors of the inventive and comparative examples are substantially the same. However, the internal resistances of the electric double layer capacitors according of the first through fourth examples are 1/4, 2/15, 1/10, and 1/15, respectively, of the internal resistance of the electric double layer according to the comparative example, for the reason that the electrode body is held in contact with the current collector through the electrically conductive layer which is held in intimate contact with the electrode body.

With the present invention, as described above, an electrode body, which will be impregnated with an electrolytic solution to form a polarized electrode, is held in contact with a current collector through an electrically conductive layer which is made of metal powder or foil and intimately joined to the electrode body at the time the electrode body is sintered. Therefore, the electrically conductive layer is held in intimate contact with a roughened porous surface of the sintered electrode body. The electric resistance between the electrode body and the current collector through the electrically conductive layer is thus reduced, so that the electric double layer capacitor has a reduced internal resistance.

As described above, the electrically conductive layer is formed on the electrode body at the same time that the electrode body is sintered by the sintering mold. Therefore, no special dedicated device is needed to form the electrically conductive layer on the electrode body. Consequently, the electric double layer capacitor of good performance can be manufactured according to a simple manufacturing process.

Although a certain preferred embodiment has been shown and described, it should be understood that many changes and modifications may be made therein without departing from the scope of the appended claims.

What is claimed is:

1. An electric double layer capacitor having an electric double layer composed of an interface between activated carbon and electrolyte, comprising:
    a pair of electrode bodies having surfaces confronting each other, each of said electrode bodies comprising a porous sintered body of joined active carbon particles;
    a pair of electrically conductive layers formed on and fused to respective other surfaces of said electrode bodies at the time the electrode bodies are sintered;
    a separator interposed between said electrode bodies;
    a gasket housing said electrode bodies and said separator therein; and
    a pair of current collectors disposed on the respective other surfaces of said electrode bodies in contact with said electrically conductive layers, respectively, said current collectors having respective peripheral edges joined to said gasket.

2. An electric double layer capacitor according to claim 1, wherein each of said electrically conductive layers comprises a sintered layer of metal powder.

3. An electric double layer capacitor according to claim 1, wherein each of said electrically conductive layers comprises a metal foil.

4. A method of manufacturing a polarized electrode for an electric double layer capacitor having an electric double layer composed of an interface between activated carbon and electrolyte, said method comprising the steps of:

placing an electrically conductive material in a sintering mold;

placing powder of minute active carbon particles on said electrically conductive material in the sintering mold;

pressing the powder of minute active carbon particles and the electrically conductive material in the sintering mold; and sintering the powder of minute active carbon particles and the electrically conductive material while under pressure, thereby forming an electrically conductive layer and an electrode body, respectively, which are intimately joined to each other.

5. A method according to claim 4, wherein said step of sintering comprises the step of applying a pulsed electric current to the powder of minute active carbon particles and the electrically conductive material, and thereafter applying a heating current to the powder of minute active carbon particles and the electrically conductive material.

* * * * *

UNITED STATES PATENT AND TRADEMARK OFFICE
CERTIFICATE OF CORRECTION

PATENT NO. : 5,115,378
DATED : May 19, 1992
INVENTOR(S) : Yoshinobu Tsuchiya et al Page 1 of 2

It is certified that error appears in the above-indentified patent and that said Letters Patent is hereby corrected as shown below:

Title Page, Col. 2, after line 1, insert the following:

--FOREIGN PATENT DOCUMENTS

56-080120  1/1981  Japan 56-070623  12/1981 Japan

OTHER PUBLICATIONS

Patent Abstracts of Japan, Vol. 13, No. 584 (E-866)

(3932), Dec. 22, 1989, & JP-A-1 246813

(Asahi Glass) 2 October 1989

UNITED STATES PATENT AND TRADEMARK OFFICE
CERTIFICATE OF CORRECTION

PATENT NO. : 5,115,378
DATED : May 19, 1992
INVENTOR(S) : Yoshinobu Tsuchiya et al It is certified that error appears in the above-indentified patent and that said Letters Patent is hereby corrected as shown below:

Patent Abstracts of Japan, Vol. 14, No. 73 (E-887) (4016), Feb. 9, 1990, & JP-A-1 290216 (Murata Mfg.) 22 November 1989

Patent Abstracts of Japan, Vol. 13, No. 259 (E-773), June 15, 1989, & JP-A-1 054607 (NEC) 2 March 1989

Patent Abstracts of Japan, Vol. 14, No. 168 (E-912), March 30, 1990, & JP-A-2 026009 (Hitachi Condenser) 29 January 1990--.

Col. 6, line 12, "20 82m." should be --20$\mu$m.--.

Signed and Sealed this

Third Day of August, 1993

Attest:

MICHAEL K. KIRK

*Attesting Officer*     *Acting Commissioner of Patents and Trademarks*